United States Patent
Renehan et al.

(10) Patent No.: US 7,521,903 B2
(45) Date of Patent: Apr. 21, 2009

(54) MONOLITHIC ALTERNATOR REGULATOR WITH CONFIGURABLE REGULATION MODES

(75) Inventors: John Renehan, South Lyon, MI (US); Peter Sommerfeld, Essen (DE); Franz Grabowski, Xanten (DE); Andreas Mersmann, Essen (DE)

(73) Assignee: ASBU Holdings, LLC, Boulder, CO (US)

( * ) Notice: Subject to any disclaimer, the term of this patent is extended or adjusted under 35 U.S.C. 154(b) by 279 days.

(21) Appl. No.: 11/462,060

(22) Filed: Aug. 3, 2006

(65) Prior Publication Data

US 2007/0029978 A1 Feb. 8, 2007

Related U.S. Application Data

(60) Provisional application No. 60/706,498, filed on Aug. 8, 2005.

(51) Int. Cl.
 *H02H 7/06* (2006.01)
 *H02P 11/00* (2006.01)
 *H02P 9/00* (2006.01)
(52) U.S. Cl. .............................. 322/24; 322/59; 322/17
(58) Field of Classification Search .................. 322/17, 322/24, 28, 59; 307/10.1; 320/117
 See application file for complete search history.

(56) References Cited

U.S. PATENT DOCUMENTS

| | | | | | |
|---|---|---|---|---|---|
| 5,973,481 | A | * | 10/1999 | Thompson et al. | 322/7 |
| 6,107,698 | A | * | 8/2000 | Ochiai et al. | 307/43 |
| 6,215,277 | B1 | * | 4/2001 | Renehan | 320/117 |
| 6,573,689 | B1 | * | 6/2003 | Renehan | 322/24 |
| 6,670,792 | B1 | * | 12/2003 | Renehan | 322/28 |
| 2002/0036910 | A1 | * | 3/2002 | Yang | 363/21.07 |
| 2005/0269880 | A1 | * | 12/2005 | Konishi | 307/10.7 |

FOREIGN PATENT DOCUMENTS

| | | | |
|---|---|---|---|
| EP | 1401081 A2 | * | 3/2004 |
| JP | 200333092 | | 1/2003 |
| JP | 2004266989 A | * | 9/2004 |

OTHER PUBLICATIONS

Machine-generated English translation of Japanese Patent Laid Open 2003-33,092.
English translation of rejection by Japanese Patent Office of Japanese Patent Laid Open 2006-215271, the Japanese counterpart to the present U.S. Appl. No. 11/462,060.

* cited by examiner

*Primary Examiner*—Julio Gonzalez
(74) *Attorney, Agent, or Firm*—Van Dyke, Gardner, Linn & Burkhart, LLP (57) ABSTRACT

An integrated circuit for controlling an alternator circuit in an alternator regulator charging system. The integrated circuit includes a first circuit for performing core regulation functions; a second circuit having a mask selectable operation circuit that allows the integrated circuit to select an operational mode thereof, the mode being selectable from one of a stand-alone mode, a remote controlled mode wherein the first circuit is controlled by an external circuit, and a combination of the stand-alone mode and the remote controlled mode; and a third circuit having an output driver circuit for controlling a field winding of the alternator circuit.

18 Claims, 7 Drawing Sheets

MONOLITHIC ALTERNATOR REGULATOR WITH CONFIGURABLE REGULATION MODES

CROSS-REFERENCE TO RELATED APPLICATION

This application is based on and claims the benefit of U.S. Provisional Application Ser. No. 60/706,498, filed on Aug. 8, 2005, entitled MONOLITHIC ALTERNATOR REGULATOR WITH CONFIGURABLE REGULATION MODES, to which a claim of priority is hereby made and the disclosure of which is incorporated by reference.

BACKGROUND OF THE INVENTION

The present invention relates to an alternator regulator and more particularly to an alternator regulator that can be configured to operate in configurable regulation modes.

Automotive alternator regulators incorporate several requirements and features that are customized for specific applications. Because of the high cost and concerns about robustness of a more flexible solution, such as a microprocessor design, the design architecture of the automotive alternator regulators typically utilizes an Application Specific Integrated Circuit (ASIC).

Typically, to reduce integrated circuit cost and complexity, certain ASIC features are excluded from specific design types. This results in the problem of development of distinct IC designs intended to target specific automotive charging system applications. Those applications may include separate stand-alone or remotely controlled operation instead of one IC solution covering both types of applications and possibly even a combination of the two. In a remotely controlled alternator regulator, typically control is performed by a separate module, e.g., the powertrain control module (PCM).

Prior art methods use distinct stand-alone and remote controlled alternator regulators that do not provide the capability to configure/combine the features of the two systems into a single solution. The disadvantages of this approach include separate development and qualification of each system and associated components as well as higher overall manufacturing cost.

SUMMARY OF THE INVENTION

It is an object of the present invention to provide an alternator regulator and an alternator regulator control integrated circuit with a feature set that can be used for stand-alone, remote controlled and combinational design alternator regulator charging systems.

An integrated circuit for controlling an alternator circuit in an alternator regulator charging system is provided. The integrated circuit includes a first circuit for performing core regulation functions; a second circuit having a mask selectable operation circuit that allows the integrated circuit to select an operational mode thereof, the mode being selectable from one of a stand-alone mode, a remote controlled mode wherein the first circuit is controlled by an external circuit, and a combination of the stand-alone mode and the remote controlled mode; and a third circuit having an output driver circuit for controlling a field winding of the alternator circuit.

An alternator regulator capable of operation in configurable modes is also disclosed.

Other features and advantages of the present invention will become apparent from the following description of the invention that refers to the accompanying drawings.

DETAILED DESCRIPTION OF EMBODIMENTS OF THE INVENTION

According to the invention, a feature set for an Application Specific Integrated Circuit (ASIC) is determined. The invention provides a method of incorporation of the feature set into a monolithic ASIC that could be used for stand-alone, remotely controlled, and combinational designs for automotive charging system applications.

Core ASIC architecture is determined such that specific system interface pins are shared and provide the necessary flexibility, while limiting the cost of the IC by eliminating excess Input/Output connections.

Figure 1:
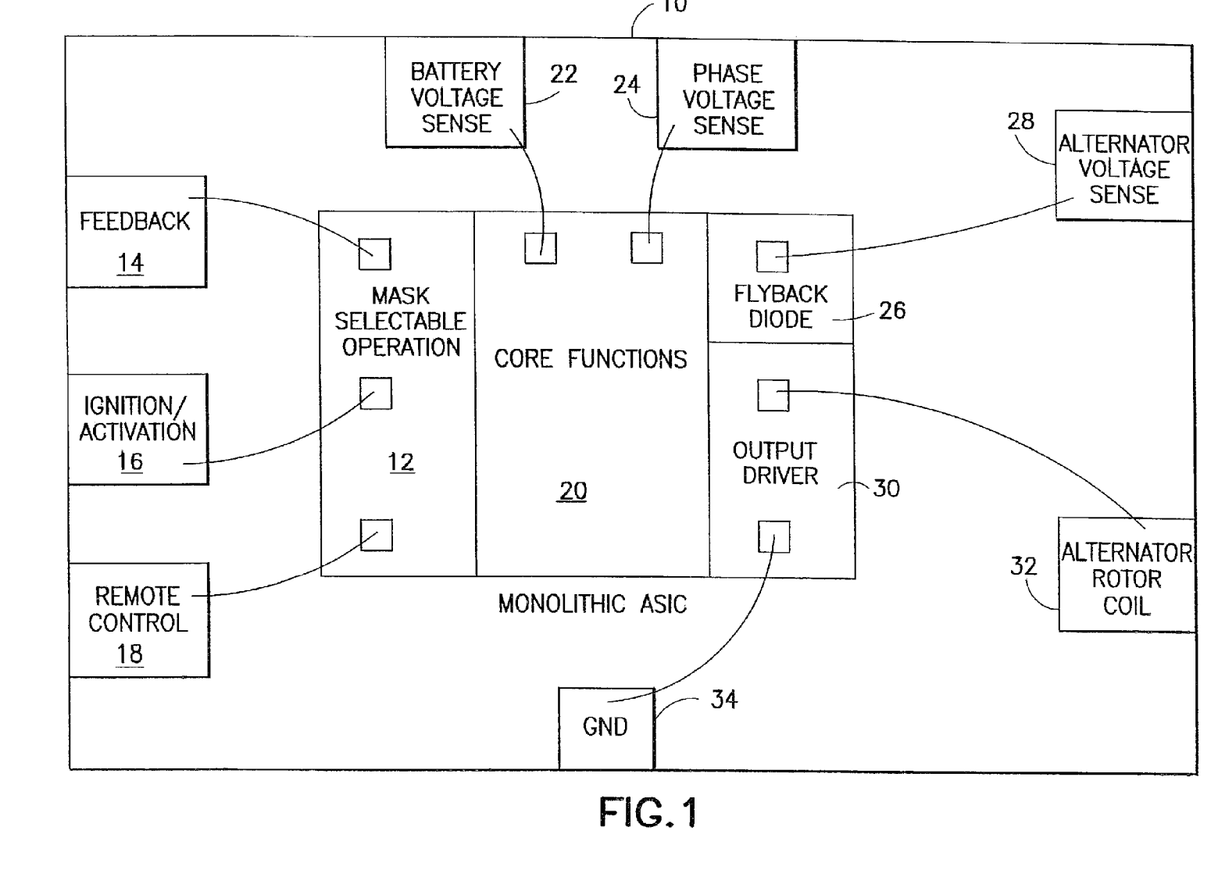
FIG. 1 is a diagram of the architecture of an ASIC Alternator Regulator Charging System in accordance with one embodiment of the present invention.

FIG. 1 shows a monolithic ASIC 10 designed and used for an Alternator Regulator Charging System in accordance with the present invention. The ASIC 10 includes regulation control circuitry and a plurality of pins for providing and receiving input and output signals.

In particular, monolithic ASIC 10 comprises a regulation control circuit 20 for performing monolithic ASIC core regulation functions. The circuit 20 receives battery voltage sense signal from pin 22 and alternator winding phase voltage sense signal from pin 24.

The monolithic ASIC 10 further comprises a circuit 12 for performing a mask selectable operation. When the monolithic ASIC 10 is used in a stand-alone Alternator Regulator Charging System, circuit 12 is provided with an ignition/activation signal at pin 16 from the automotive ignition switch. However, when the monolithic ASIC 10 is used in a remote-control Alternator Regulator Charging System, circuit 12 will provide a feedback output signal to pin 14, and receives remote control signals at pin 18. In the remote-control Alternator Regulator Charging System, the remote control interface may comprise a two line PWM interface (chassis ground being the second line) that provides asynchronous communication between the PCM and the ASIC. Other features include 0 mV/° C. temperature compensation, and optionally RC input command for Z-curve mode.

In stand-alone operation, line 16 provides ignition line power-up to the ASIC. In addition, other features include −10 mV/° C. temperature compensation, z curve temperature compensation and lamp driver capability for charging fault indication.

Additionally, the monolithic ASIC 10 comprises a circuit 26 that includes a flyback diode for the field winding current when the regulator output driver switch is turned off. The cathode of the flyback diode is connected to the alternator voltage sense at pin 28. Finally, the monolithic ASIC 10 comprises an output driver circuit 30 that includes the regulator output field driver switch. The drain and source of the switch, if a FET, are connected between the anode of the diode of circuit 26 and the ground at pin 34. The gate of the field driver switch is controlled by the core circuit 20. The field driver switch controls the alternator field winding via pin 32.

Figure 2A:
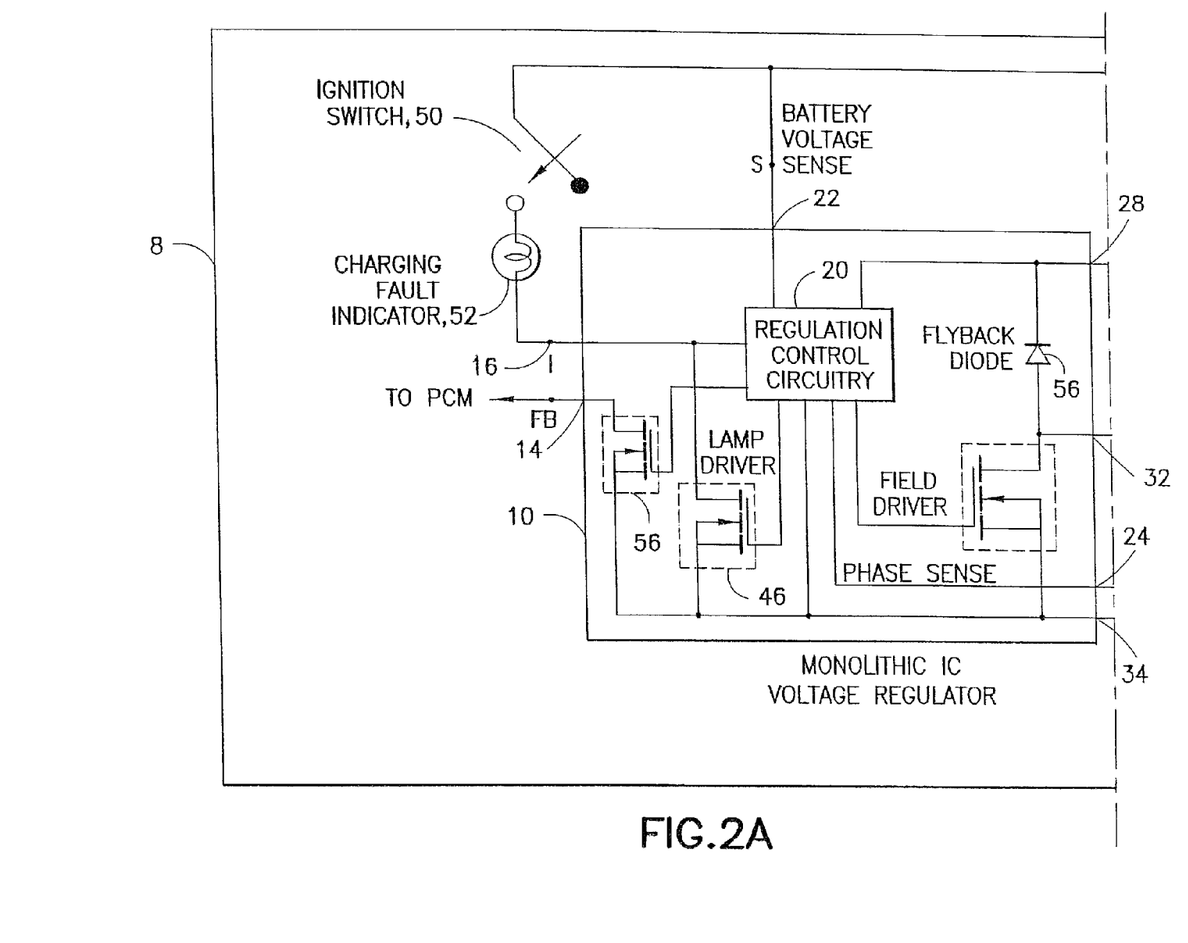
FIGS. 2A and 2B are corresponding halves of a system level integration diagram of a stand-alone Alternator Regulator Charging System design in accordance with one embodiment of the present invention.
Figure 2B:
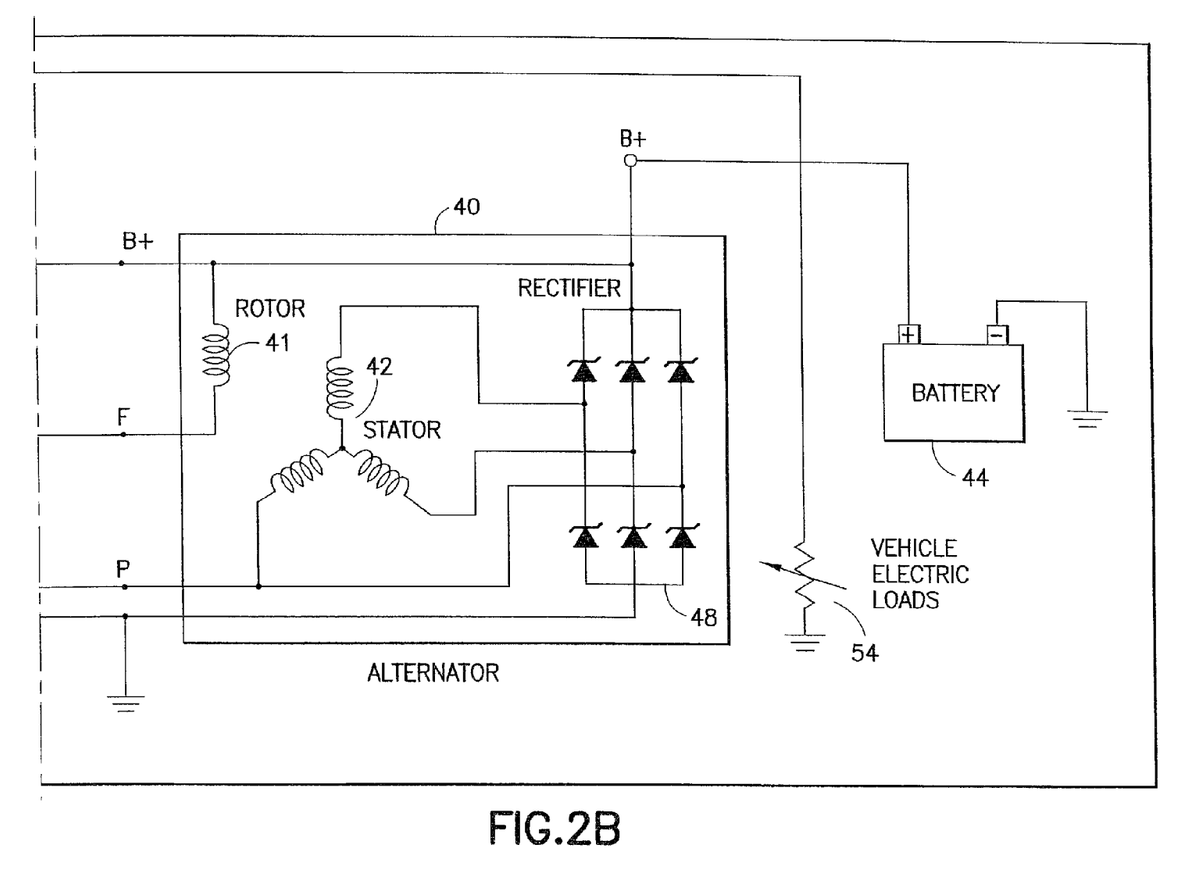

FIG. 2 shows a stand-alone Alternator Regulator Charging System 8. The stand-alone Alternator Regulator Charging System 8 includes the monolithic ASIC voltage regulator 10, an alternator circuit 40, a battery 44, an ignition switch 50, a charging fault indicator 52 such as a lamp, and vehicle electric loads 54. The alternator circuit 40 includes alternator field rotor 41, a three phase stator 42, and a three phase full wave diode rectifier bridge 48.

The alternator circuit 40 is coupled to a battery 44 via the cathode terminals of the six diode rectifier 48 and to the ground via the anode terminals. It is further connected to the monolithic ASIC 10, wherein the rotor 41 is parallel connected to the flyback diode 56 at pins 28 and 32 and a stator 42 winding is connected to pin 24 to provide a phase voltage sense.

The monolithic ASIC 10 is further shown to include a lamp driver switch 46 for driving the charging fault indicator 52. Switch 56 can optionally provide a feedback signal on the state of the charging system to the PCM via FB pin 14, even in the stand-alone system.

Figure 3A:
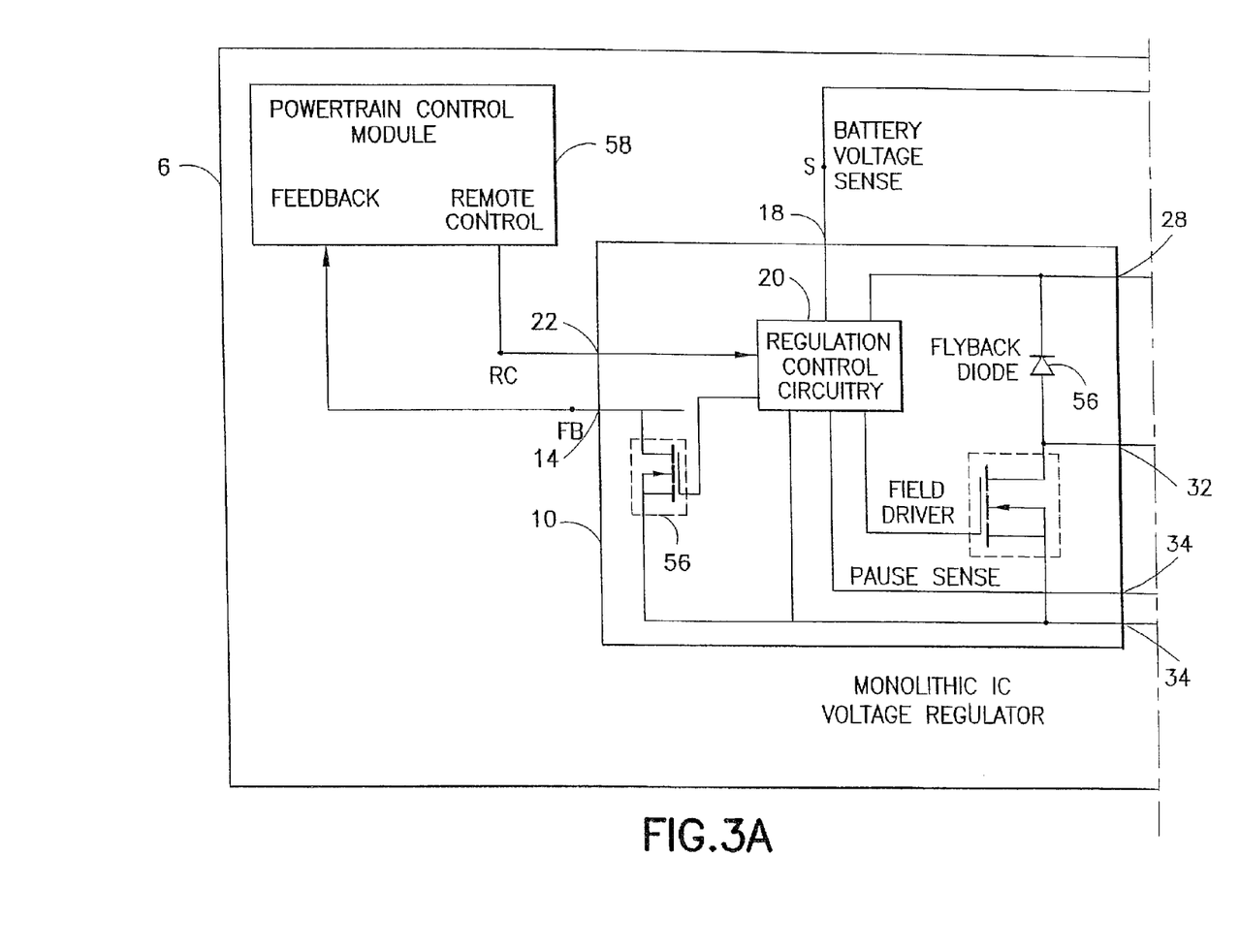
FIGS. 3A and 3B are corresponding halves of a system level integration diagram of a remote controlled Alternator Regulator Charging System design in accordance with one embodiment of the present invention.
Figure 3B:
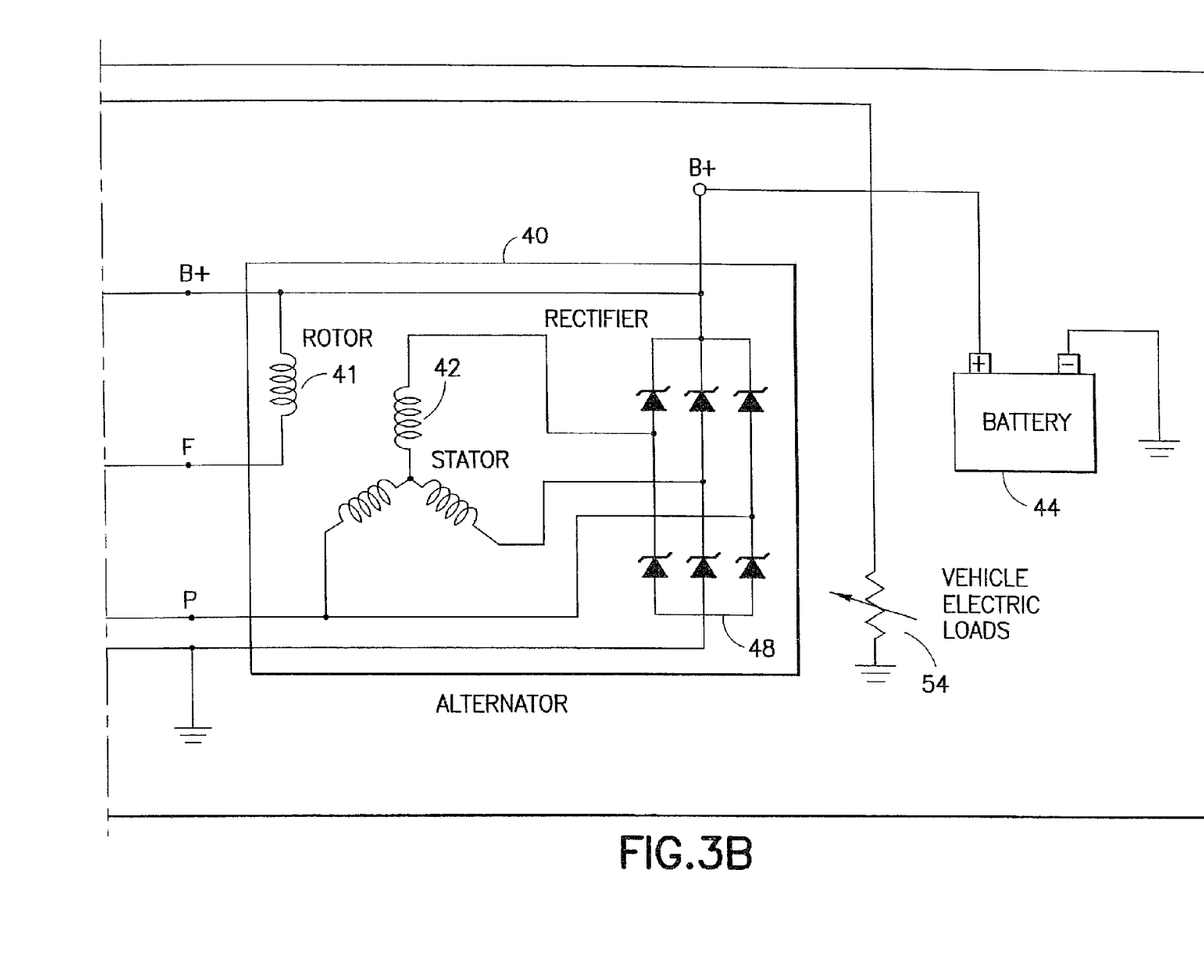

FIG. 3 shows a remote-controlled Alternator Regulator Charging System 6. As in FIG. 2, the remote-controlled Alternator Regulator Charging System 6 includes the monolithic ASIC voltage regulator 10, an alternator circuit 40, a battery 44, and vehicle electric loads 54. In addition, it includes a powertrain control module 58, which receives feedback from pin 14, the feedback being provided by the circuit 20, and provides remote control signals via PWM to pin 18 to control the regulator.

As in FIG. 2, the alternator circuit 40 includes a field rotor 41, a three phase stator 42, and a six diode rectifier bridge 48. The alternator circuit 40 is coupled to a battery 44 via the cathode terminals of the six diode rectifier 48 and to the ground via the anode terminals. It is further connected to the monolithic ASIC 10, wherein the rotor winding 41 is parallel connected to the flyback diode at pins 28 and 32 and a stator 42 winding is connected to pin 24 to provide a phase voltage sense.

The remote-controlled Alternator Regulator Charging System 6 does not include a charging indicator, so the lamp driver 46 of FIG. 2 is not used. The powertrain control module 58 receives the feedback signal 14 regarding charging system operation and generates remote control signals 18 to control regulation.

Both Alternator Regulator Charging Systems discussed above, with reference to FIGS. 2 and 3, the stand-alone and remote controlled respectively, include the following common functions:

1. A configurable feedback pin;
2. System specific self excitation;
3. System specific default regulation for stand alone/fault mode operation;
4. Configurable load regulation;
5. Configurable Load Response Control;
6. Configurable fault detection;
7. Overvoltage and short circuit protection;
8. alternator phase voltage sensing; and
9. Optional battery voltage sensing.

Figure 4A:
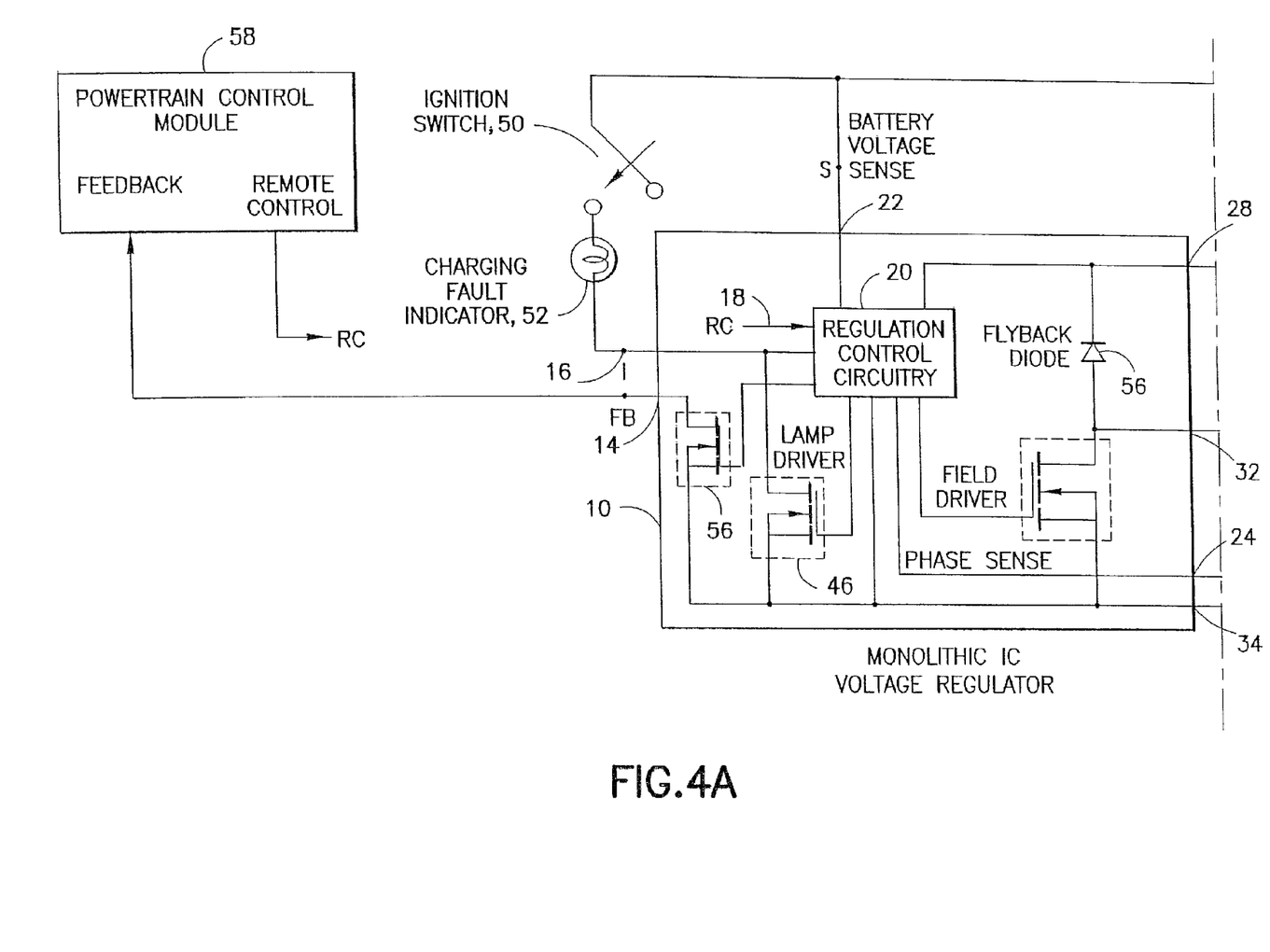
FIGS. 4A and 4B are corresponding halves of a combination stand-alone and remote controlled system.
Figure 4B:
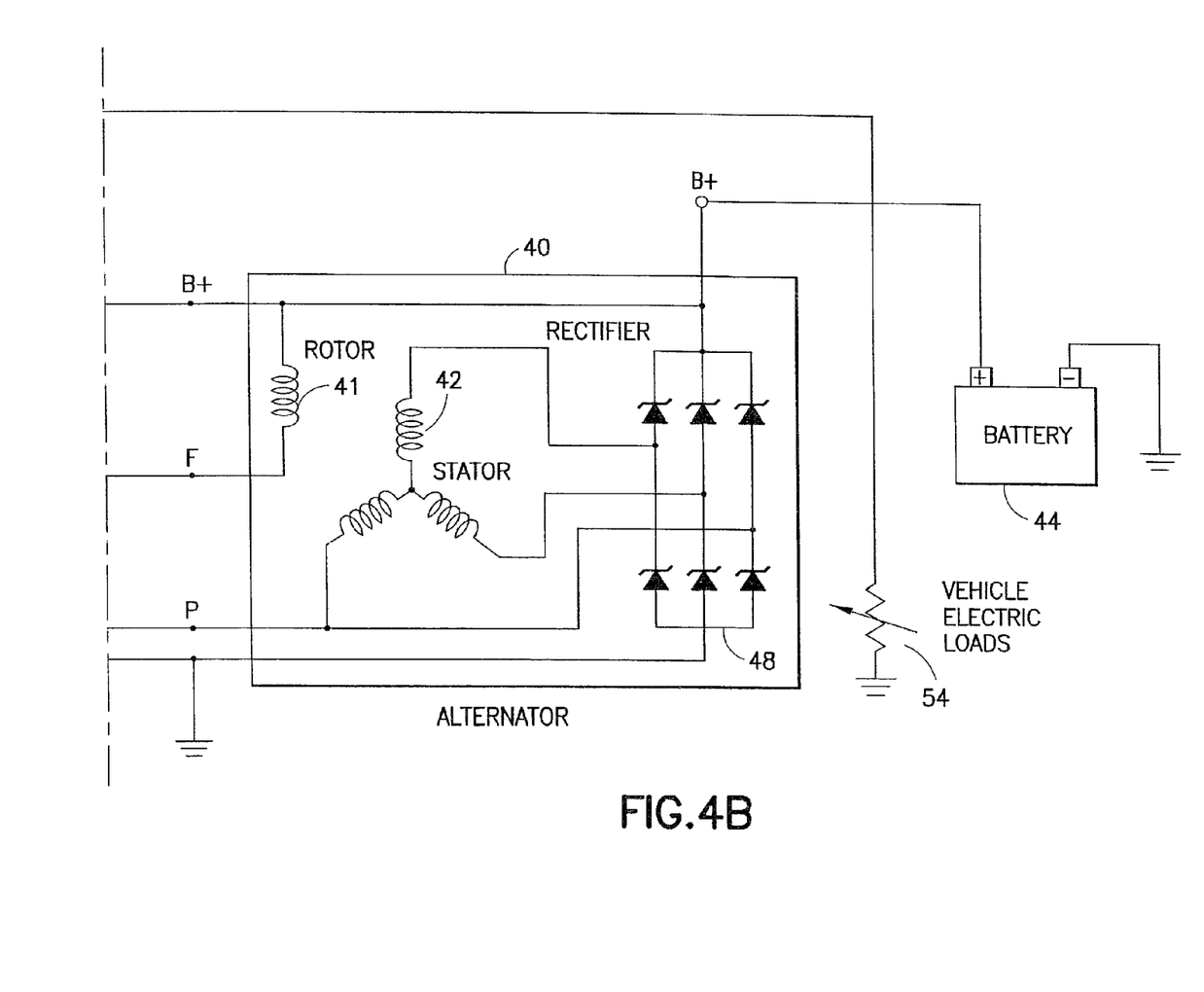

FIG. 4 shows a combinational Alternator Regulator Charging System 6, which can be used in both a stand-alone mode and in a remote controlled mode. The same reference numbers as in FIGS. 2 and 3 are used for the same elements. As in FIG. 2, the remote-controlled Alternator Regulator Charging System 6 includes the monolithic ASIC voltage regulator 10, an alternator circuit 40, a battery 44, and vehicle electric loads 54. In addition, it includes a powertrain control module 58, which receives feedback from pin 14, the feedback being provided by the circuit 20, and provides remote control signals via PWM to pin 18 to control the regulator.

The alternator circuit 40 includes a field rotor 41, a three phase stator 42, and a six diode rectifier bridge 48. The alternator circuit 40 is coupled to a battery 44 via the cathode terminals of the six diode rectifier 48 and to the ground via the anode terminals. It is further connected to the monolithic ASIC 10, wherein the rotor winding 41 is parallel connected to the flyback diode at pins 28 and 32 and a stator 42 winding is connected to pin 24 to provide a phase voltage sense.

The combination Alternator Regulator Charging System 6 includes an ignition switch 50, a charging fault indicator 52, and a lamp driver 46. Also included is a powertrain control module 58 that receives, through switch 56, feedback signals 14 regarding the charging system's operation and generates remote control signals 18 to control regulation.

Table 1 illustrates an example of three feature set implementations achievable in a single monolithic ASIC.

| Feature | Stand Alone | Remote Controlled | Combination |
| --- | --- | --- | --- |
| LRC Ramp Rate | 8.4 s | Disabled | 8.4 s |
| LR Cut Off Speed | 3000 RPM | N/A | 3000 RPM |
| LRC Low Battery Disable | Yes | N/A | Yes |
| Temperature Compensation | −10 mV/° C. | 0 mV/° C. | 0 mV/° C. or Z curve |
| Loss of Battery Sense fault indication | Yes | Yes | Yes |
| Load Regulation Range | 300 mV | 300 mV | 200 mV |
| Default Regulation | N/A | 13.5 V | 14.3 V |
| Feedback Polarity | Negative | Positive | Positive |
| Feedback Max Duty Cycle | 100% | 97% | 97% |
| Feedback Fault Indication | No | Yes | Yes |
| Thermal Fault Indication | No | Yes | No |
| Phase Frequency Detection | 12 pole | 14 pole | 16 pole |
| RC pulse > Field Drive Period | N/A | Max Set-point | Stand alone regulation |

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. An integrated circuit for controlling an automotive alternator circuit in an alternator regulator charging system, the integrated circuit comprising:
    a first circuit for performing core regulation functions of the automotive alternator circuit;
    a second circuit having a mask selectable operation circuit that allows the integrated circuit to select an operational mode thereof, the mode being selectable from one of a stand-alone mode, a remote controlled mode wherein the first circuit is controlled by an external circuit, and a combination of the stand-alone mode and the remote controlled mode; and
    a third circuit comprising an output driver circuit for controlling a field winding of the automotive alternator circuit.

2. The integrated circuit of claim 1, wherein the integrated circuit is capable of performing functions selected from one of a configurable feedback pin; system specific self excitation; system specific default regulation for stand alone/fault mode operation; configurable load regulation; configurable Load Response Control; configurable fault detection; overvoltage and short circuit protection; machine voltage sensing; and optional battery voltage sensing.

3. The integrated circuit of claim 2, wherein an optimal feature set for the integrated circuit is determined and the feature set is incorporated into a monolithic ASIC that could be used for a stand alone, remotely controlled, or combinational designs automotive charging system applications.

4. The integrated circuit of claim 1, wherein the first circuit for performing core regulation functions receives battery voltage and phase voltage sense signals.

5. An integrated circuit for controlling an alternator circuit in an alternator regulator charging system, the integrated circuit comprising:
   a first circuit for performing core regulation functions;
   a second circuit having a mask selectable operation circuit that allows the integrated circuit to select an operational mode thereof, the mode being selectable from one of a stand-alone mode, a remote controlled mode wherein the first circuit is controlled by an external circuit, and a combination of the stand-alone mode and the remote controlled mode;
   a third circuit comprising an output driver circuit for controlling a field winding of the alternator circuit; and
   a remote control terminal on said integrated circuit comprising a two line PWM interface for providing asynchronous communication between the external circuit and the integrated circuit.

6. The integrated circuit of claim 1, wherein the integrated circuit further comprises a lamp driver switch for driving the charging fault indicator.

7. An alternator regulator circuit comprising:
   an integrated circuit comprising:
   a first circuit for performing core regulation functions of an automotive alternator circuit;
   a second circuit having a mask selectable operation circuit that allows the integrated circuit to select an operational mode thereof, the mode being selectable from one of a stand-alone mode, a remote controlled mode wherein the first circuit is controlled by an external circuit, and a combination of the stand-alone mode and the remote controlled mode;
   a third circuit comprising an output driver circuit for controlling a field winding of the automotive alternator circuit; and
   an alternator circuit having a field winding coupled for control by the output driver circuit and a stator winding coupled to an automotive battery and an automotive load circuit.

8. The alternator regulator circuit of claim 7, wherein the alternator circuit includes a field rotor winding, a three phase stator, and a rectifier bridge, wherein each phase of the stator is connected to a respective two diode bridge of the rectifier bridge.

9. The alternator regulator circuit of claim 8, wherein the alternator circuit is coupled to the battery and load circuit via a cathode terminal of the rectifier bridge and to ground via an anode terminal of the bridge.

10. The alternator regulator circuit of claim 9, wherein the alternator field winding is coupled to the integrated circuit for control by a field driver switch across a flyback diode and the stator winding is connected to a phase voltage sense circuit of the integrated circuit.

11. The alternator regulator circuit of claim 7, wherein the circuit for performing core regulation functions receives battery voltage and phase voltage sense signals.

12. The alternator regulator circuit of claim 7, further comprising an ignition switch and a charging fault indicator coupled to said integrated circuit.

13. The alternator regulator circuit of claim 7, further comprising a remote control terminal on said integrated circuit comprising a two line PWM interface for providing asynchronous communication between the external circuit and the integrated circuit.

14. The alternator regulator circuit of claim 7, wherein the external circuit comprises a Powertrain Control Module for receiving feedback from the integrated circuit and providing remote control signals to the integrated circuit to control the alternator circuit.

15. The alternator regulator circuit of claim 12, wherein the integrated circuit further comprises a lamp driver switch for driving the charging fault indicator.

16. The alternator regulator circuit of claim 12, further comprising a Powertrain Control Module for receiving feedback from the integrated circuit and providing remote control signals.

17. The alternator regulator circuit of claim 14, wherein the integrated circuit is capable of performing functions selected from one of a configurable feedback pin; system specific self excitation; system specific default regulation for stand alone/fault mode operation; configurable load regulation; configurable Load Response Control; configurable fault detection; overvoltage and short circuit protection; machine voltage sensing; and
   optional battery voltage sensing.

18. The alternator regulator circuit of claim 17, wherein an optimal feature set for the integrated circuit is determined and the feature set is incorporated into a monolithic ASIC that could be used for a stand alone, remotely controlled, or combinational designs automotive charging system applications.

* * * * *